(12) United States Patent
Gilbert et al.

(10) Patent No.: US 9,733,738 B2
(45) Date of Patent: Aug. 15, 2017

(54) SYSTEM AND METHOD FOR COMMUNICATION REPRODUCING AN INTERACTIVITY OF PHYSICAL TYPE

(71) Applicant: RENAULT S.A.S., Boulogne-Billancourt (FR)

(72) Inventors: Nicolas Gilbert, Antony (FR); Herve Denoual, Plaisir (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 120 days.

(21) Appl. No.: 14/648,570

(22) PCT Filed: Nov. 22, 2013

(86) PCT No.: PCT/EP2013/074470
§ 371 (c)(1),
(2) Date: May 29, 2015

(87) PCT Pub. No.: WO2014/082928
PCT Pub. Date: Jun. 5, 2014

(65) Prior Publication Data
US 2015/0301634 A1  Oct. 22, 2015

(30) Foreign Application Priority Data

Nov. 29, 2012  (FR) .................................... 12 61406
Dec. 7, 2012  (FR) .................................... 12 61750

(51) Int. Cl.
*G06F 3/041* (2006.01)
*G06F 3/043* (2006.01)
(Continued)

(52) U.S. Cl.
CPC .......... *G06F 3/041* (2013.01); *G06F 3/03545* (2013.01); *G06F 3/043* (2013.01);
(Continued)

(58) Field of Classification Search
CPC combination set(s) only.
See application file for complete search history.

(56) References Cited

U.S. PATENT DOCUMENTS 5,402,151 A  3/1995 Duwaer
6,611,258 B1  8/2003 Tanaka et al.
(Continued)

FOREIGN PATENT DOCUMENTS

EP  2 228 711 A2  9/2010

OTHER PUBLICATIONS

International Search Report issued Feb. 20, 2014, in PCT/EP2013/074470, filed Nov. 22, 2013.
(Continued)

*Primary Examiner* — Van Chow
(74) *Attorney, Agent, or Firm* — Oblon, McClelland, Maier & Neustadt, L.L.P.

(57) ABSTRACT

To reproduce an interactivity of physical type between at least two parties or participants in a meeting, the system comprises at least one display screen (20, 21, 22) which comprises a first device arranged so as to detect at least one position of a human finger by measuring a first physical quantity which varies as a function of a human finger contact on said screen (20, 21, 22), and a second device arranged so as to detect at least one position of an object (30, 31, 32) equipped in such a way as to emit a uniform signal, by measuring a second physical quantity related to a reception of said uniform signal which varies as a function of the position of the object (30, 31, 32) with respect to the screen (20, 21, 22). A computer (10, 11, 12) of the system, configured to receive the human finger's position detected by the first device and the object's position detected by the second device, is programmed to allocate an area of the screen (20, 21, 22) for writing, so as to modify, in the area allocated for
(Continued)

writing, a local visual aspect which follows the position of the object (20, 21, 22) on the screen when the object emits the uniform signal and to vary the area allocated for writing as a function of a displacement related to the position of the human finger on the screen (20, 21, 22).

22 Claims, 9 Drawing Sheets

(51) Int. Cl.
  *G06F 3/044* (2006.01)
  *G06F 3/0488* (2013.01)
  *G06F 3/0354* (2013.01)

(52) U.S. Cl.
  CPC .......... *G06F 3/044* (2013.01); *G06F 3/04883* (2013.01); *G06F 2203/04104* (2013.01); *G06F 2203/04106* (2013.01); *G06F 2203/04808* (2013.01)

(56) References Cited

U.S. PATENT DOCUMENTS

| | | |
|---|---|---|
| 2008/0284925 A1 | 11/2008 | Han |
| 2010/0234077 A1 | 9/2010 | Yoo et al. |
| 2010/0318470 A1 | 12/2010 | Meinel et al. |
| 2011/0163964 A1 | 7/2011 | Cho |
| 2011/0163983 A1* | 7/2011 | Maki ..................... G06F 3/0416 345/173 |
| 2011/0169756 A1 | 7/2011 | Ogawa et al. |
| 2012/0182266 A1 | 7/2012 | Han |
| 2013/0047093 A1* | 2/2013 | Reuschel ............ G06F 3/04883 715/753 |

OTHER PUBLICATIONS

French Preliminary Search Report issued Aug. 13, 2013, in Patent Application No. FR 1261406, filed Nov. 29, 2012 (with English Translation of Category of Cited Documents).

Raja Gumienny, et al., "Tele-Board: Enabling Efficient Collaboration in Digital Design Spaces", Proceedings of the 2011 15$^{th}$ International Conference on Computer Supported Cooperative Work in Design, XP 031902295, Jun. 8, 2011, pp. 47-53.

"Tele-Board | Connecting Ideas", https://www.youtube.com/watch?v=CkTXLwXSezE, XP 054975315, Mar. 22, 2012, 1 page.

Peter Brandl, et al., "An Adaptable Rear-Projection Screen Using Digital Pens and Hand Gestures", 17$^{th}$ International Conference on Artificial Reality and Telexistence, XP 031199340, Nov. 2007, pp. 49-54.

* cited by examiner

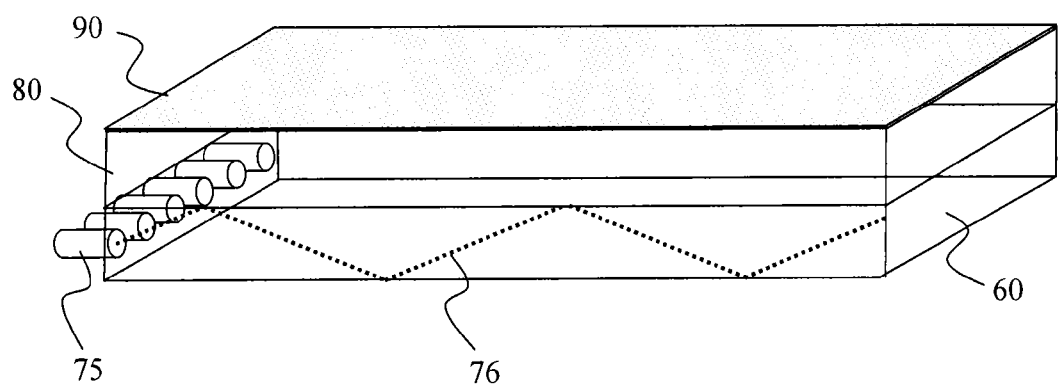
*fig.* 8
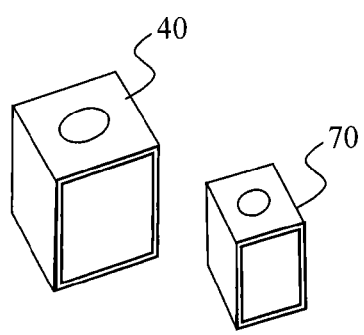

SYSTEM AND METHOD FOR COMMUNICATION REPRODUCING AN INTERACTIVITY OF PHYSICAL TYPE

The invention relates to a communication system and method reproducing an interactivity of physical type between two, or more than two, participants by means of at least one display screen which comprises a device arranged to detect positions of human fingers in contact with the screen, in particular by measuring a physical size which varies according to a contact of the human finger on the screen.

TECHNICAL FIELD

Touch screens are already known on appliances of small size such as cell phones or communicating touch tablets which offer an essentially virtual interactivity to a number of players who communicate with one another by manipulating functionalities of their respective appliances, each dedicated to one user.

It is felt that there is a need to reproduce an interactivity of physical type between the players who are participants in a meeting, for example the interactivity provided by sharing on a common physical medium, by the possibility of not having to focus on a small appliance and of being seen life-size. This type of interactivity has already existed for a long time in classrooms or meeting rooms by using a large table, large format paperboards on which people can write in turn by passing on a chalk or a pencil or on which full size documents of different kinds can be glued.

PRIOR ART

The state of the art proposes various implementations of modern technologies, notably in the field of electronics and computing for greatly increasing this interactivity by retaining its physical aspect, but without providing full satisfaction.

The document WO99/29100 for example discloses a method for retrieving and storing information which comprises steps consisting in providing a sheet, of which a first face receives the information and an opposite face supports a repositionable adhesive, providing a digitizer with digitization means and moving carriage, providing means for retrieving and/or storing the digitized information, providing the information on the first face of the sheet, attaching the sheet by repositionable adhesive on the moving carriage, digitizing the first face of the sheet by displacing the moving carriage with the sheet under the digitization means so as to obtain the information contained on the first face of the sheet, and storing or retrieving the digital information form.

However, the solutions known from said prior art present many drawbacks. The manual tasks required of the participants to tear a sheet of paper and digitize it then stow away the sheet of paper which is sometimes bulky, can detract from the concentration of the participants and divert them from their main aim in a meeting which is more to confront ideas and knowledge than to manipulate controls of computer appliances. Another drawback with document storage in a fixed state is that of losing all the dynamic which led up to its final state.

Document U.S. Pat. No. 5,402,151 discloses a system for processing data with a touch screen and a digitization tablet, the whole being integrated into a digital capture device. The digitization tablet affords a function of drawing or writing by means of a stylus whereas touching the touch screen makes it possible to select data to be processed. Unfortunately, the system disclosed does not reproduce the technical effect of a real sheet of paper not only on which it is possible to write by means of an object of stylus type or the like, but also of a sheet of paper that can be varied, stated otherwise moved or reduced, by means of the fingers of the hand.

Document EP2228711 discloses a mobile terminal and a method for affording a user interface. An object of biro type makes it possible to navigate around the Web or to touch of the virtual buttons, in the latter case without distinction with a user finger. The apprehension of a real sheet of paper is not reproduced.

Collecting and structuring the relevant information during a meeting, which becomes all the more animated when it is spirited, raise numerous problems.

SUMMARY OF THE INVENTION

The aim of the invention is to address the problems raised by the prior art, notably in terms of effectiveness while avoiding regrettable cost increases and failure risks.

To achieve this aim, the subject of the invention is a communication system for reproducing and decupling an interactivity of physical type between at least two players, especially two participants to a meeting, comprising at least one display screen which comprises a first device designed to detect at least one human finger position by measuring a first physical quantity which varies as a function of a human finger contact on the screen, and a second device designed to detect at least one position of an object equipped in such a way as to emit a uniform signal, by measuring a second physical quantity linked with a reception of the uniform signal which varies as a function of the position of the object with respect to the screen, characterized in that it comprises a computer configured at least to receive the human finger's position detected by the first device and the object's position detected by the second device and in that the computer is programmed at least to allocate a zone of the screen to writing, to modify in the zone allocated to writing a local visual aspect which follows the position of the object on the screen when the object emits the uniform signal, and to vary the zone allocated to writing as a function of a displacement linked with the position of the human finger on the screen.

Advantageously, the zone allocated to writing demarcates a small virtual removable self-adhesive sheet of paper.

Particularly, the computer is programmed at least to allocate at least one zone of the screen to a command function in conjunction with an information display and to execute the command function when the first device detects a human finger position or the second device detects a position of the object in the zone of the screen allocated to the command function.

Particularly also, the object is equipped in such a way as to emit the uniform signal when the object is in mechanical contact with the screen.

More particularly, the signal is a continuous train of ultrasounds at predetermined frequency.

More particularly still, the system comprises at least one white board which comprises a first screen, a panoramic wall which comprises a second screen, and/or a horizontal work table which comprises a third screen, and the first device is respectively of capacitive type linked with said white board, of infrared detection type linked with said panoramic wall, or of infrared, capacitive or resistive detection type linked with said table.

Preferably, the system comprises at least one personal tablet which comprises a fourth screen and the first device linked with said personal tablet, is of capacitive type.

Particularly, the computer is programmed to generate on demand at least one copy of a small virtual removable self-adhesive sheet of paper on one of the screens of white board, of personal tablet, of panoramic wall and/or of horizontal work table, to slide on demand the copy towards one of the other screens of white board, of personal tablet, of panoramic wall and/or of horizontal work table, and to modify on demand the copy on the basis of that of the screens on which it has been generated and/or on which it has slid.

More particularly, the computer is programmed to insert a multimedia element into the small sheet.

More particularly still, the computer is connected to a knowledge base and it is programmed to access a first content hosted by the knowledge base as a function of actions of requests exerted by the human finger or by the object on the screen so as to display the first content on the screen, to enrich the knowledge base with a second content displayed on the screen as a function of expression actions exerted by the human finger or by the object on the screen which display the second content on the screen.

The subject of the invention is also a communication method for reproducing and decupling an interactivity of physical type between at least two players, especially two participants to a meeting, comprising steps consisting in detecting at least one human finger position by measuring a first physical quantity which varies as a function of a human finger contact on a screen, and steps consisting in detecting at least one position of an object equipped in such a way as to emit a uniform signal, by measuring a second physical quantity linked with a reception of the uniform signal which varies as a function of the position of the object with respect to the screen, characterized in that it comprises steps consisting in allocating a zone of the screen to writing, in receiving the detected position of the object, in modifying in the zone allocated to writing a local visual aspect which follows the position of the object on the screen when the object emits the uniform signal, in receiving the detected position of the human finger, and in varying the zone allocated to writing as a function of a displacement linked with the position of the human finger on the screen.

Advantageously, the zone allocated to writing demarcates a small virtual removable self-adhesive sheet of paper.

Particularly, the method comprises steps consisting in displaying at least one information item by a first digital processing equipment item on a display touch screen, by executing an instruction commanded by one of the players or participants, and in storing the information item by associating it with a contextual event related to the display touch screen, activated automatically by detecting the event using the first digital processing equipment item.

More particularly, the event is linked to a withdrawal of contact of living or inert matter with the display touch screen.

Also more particularly, the event is linked to a reception by the first digital processing equipment item which drives the display touch screen, of a message originating from a second digital processing equipment item and comprising the information item to be displayed and/or the event is linked to a displacement in relation to the display touch screen.

Preferably, the information item is stored in a knowledge base shared by a number of digital processing equipment items with descriptive data of said event.

Also preferably, the descriptive data of the event comprise a time-of-appearance indicator of said event.

More particularly, the information item is retrieved from the knowledge base.

Advantageously, the information item is located in an area allocated for writing which embodies a small virtual sheet of removable self-adhesive paper or which embodies a large sheet of paper which can be detached from a stack of virtual sheets of paper.

Particularly, at least one of a number of areas allocated for writing is generated from an information processing equipment item which is the only one authorized to modify any information contained in the generated area allocated for writing.

Another subject of the invention is a computer program comprising program code instructions for the execution of the steps of the method according to the invention where the program is run on one or more computers.

BRIEF DESCRIPTION OF THE DRAWINGS

Other features and advantages will become apparent on reading the following description, with reference to the appended drawings in which:

FIGS. 8 and 9 are diagrams explaining the operation of the embodiment illustrated by FIG. 7.

EMBODIMENTS OF THE INVENTION

Figure 1:
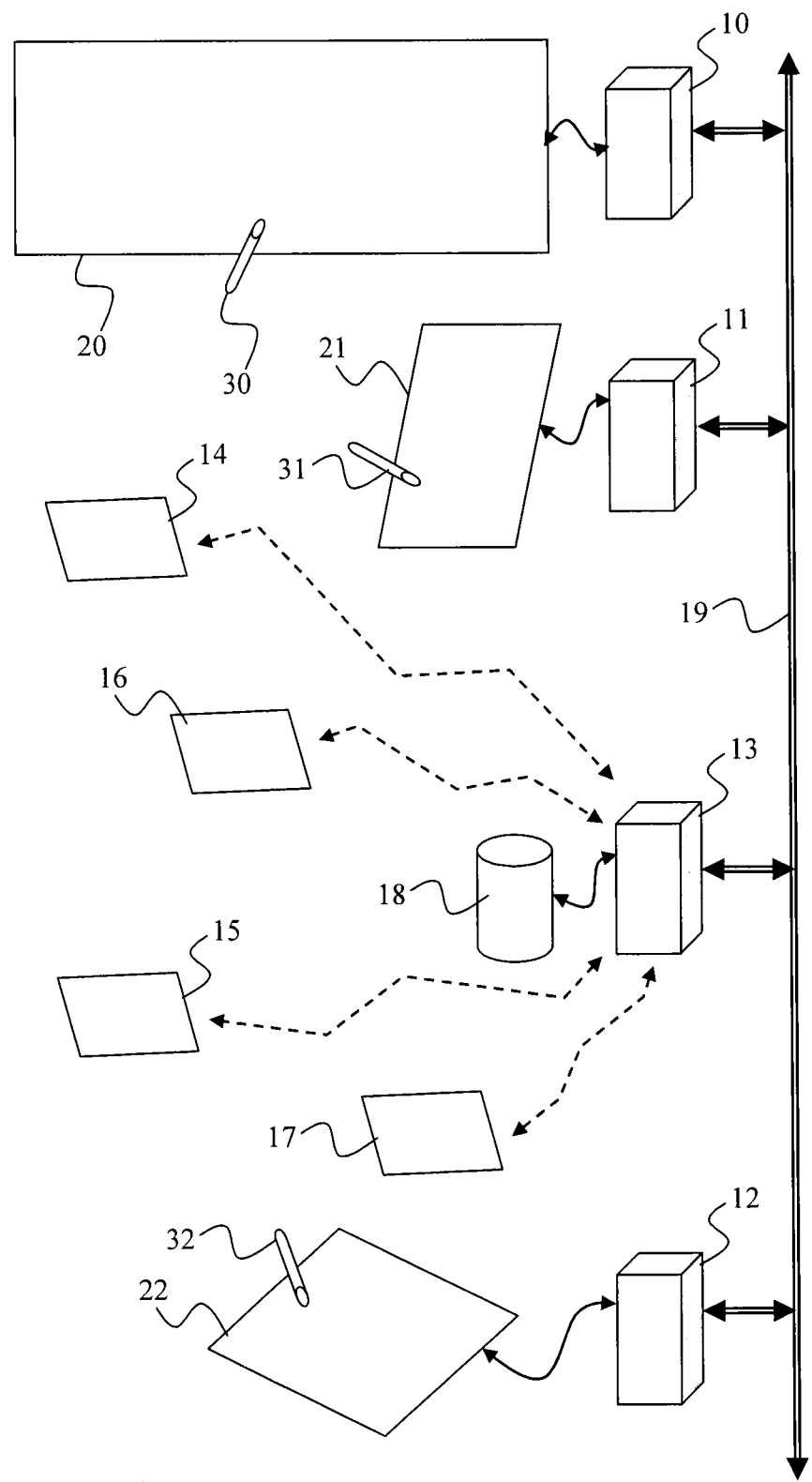
FIG. 1 shows a communication system conforming to the invention.

The communication system represented in FIG. 1 comprises a display screen 21 which embodies a virtual paperboard.

The display screen 21 comprises two devices arranged to reproduce the functionalities of a conventional physical paperboard that are generally offered to a user.

It will be recalled that a physical paperboard usually comprises a layered stack of superposed sheets of paper each with a face presented substantially vertically. The sheets are linked together by a top edge so as to be able to be easily separated successively during a presentation session by tearing or by turning over the visible sheet behind the board. The paperboard thus enables a user to have a new blank sheet on which to express his or her ideas.

The user or users generally prefer to turn over the sheets backward so as to be able to remind themselves of a previous step during the session if necessary by turning over one or more sheets forward.

Compared to the white board that has to be erased in order to continue writing when it is overloaded or in order to discuss a subsequent topic, the paperboard presents the advantage of being able to keep a trace of the session by recovering the sheets after the session is closed.

Compared to a screen on which a pre-prepared presentation is displayed, possibly modifiable by a session leader from his or her computer, the paperboard and the white board present another advantage which is that of animating the session by involving the entire body of the user who is generally standing and who writes using sweeping movements of the arm on a surface which is generally big enough to be visible to a group of participants. The possible intervention of other participants on the paperboard or the white board further animates the session. In other words, the physical objects which have just been described make it possible to combine bodily actions with cerebral actions and thus add to the power of thought and exchange capability of the participants.

So as to reproduce the advantageous functionalities explained above, the display screen 21 has dimensions comparable to those of a conventional paperboard and comprises two devices which will now be explained with reference to FIG. 2.

The first device is arranged to detect at least one human finger position by measuring a first physical quantity which varies according to a human finger contact on the screen 21.

So as to embody a white board or a paperboard by means of the screen 21, the first device linked to the white board or the paperboard is preferably of capacitive type. For example, the first device comprises a capacitive touch sensor of PCT (Projected Capacitive Touch) type, particularly suited to the surfaces of a size comparable to that of a paperboard or of a small white board, generally between one and two meters in diagonal dimension.

The screen 21 comprises a film typically consisting of four transparent layers. The layer 61 contains a network of electrical conductors oriented in a first direction, for example vertical. The layer 81 contains a network of electrical conductors oriented in a second direction, for example horizontal. The layer 71, electrically insulating, is arranged between the layers 61 and 81. The layer 91, also electrically insulating, is arranged on the front face of the screen 21 so as to create a dielectric space between the conductors of the screen and the living or inert matters in contact with the front face of the screen.

The touch operation of the screen 21 is now explained with reference to FIGS. 3 and 4.

The electrical conductors 182, 183, 184 of the layer 81 and the electrical conductors 162, 163, 164 of the layer 61, are represented in numbers significantly less than the reality which is of the order of several hundred, so as to simplify the explanations. Similarly, the scale of representation of the electrical conductors 182 to 184 and 162 to 164 is deliberately amplified. The electrical conductors are preferably produced by means of nanotubes widely spaced apart from one another in a transparent and electrically insulating matrix, so as to maintain the transparency of the layers 81 and 61. They are, for example, produced by means of fullerenes.

An electronic circuit 161 generates a charge voltage followed by a discharge voltage relative to the ground, applied in succession to each of the conductors of the layer 61. The resulting electrostatic voltage which then appears on each of the conductors of the layer 81 is measured by an electronic circuit 181 which transmits the result of the measurement to a computer 11.

Figure 3:
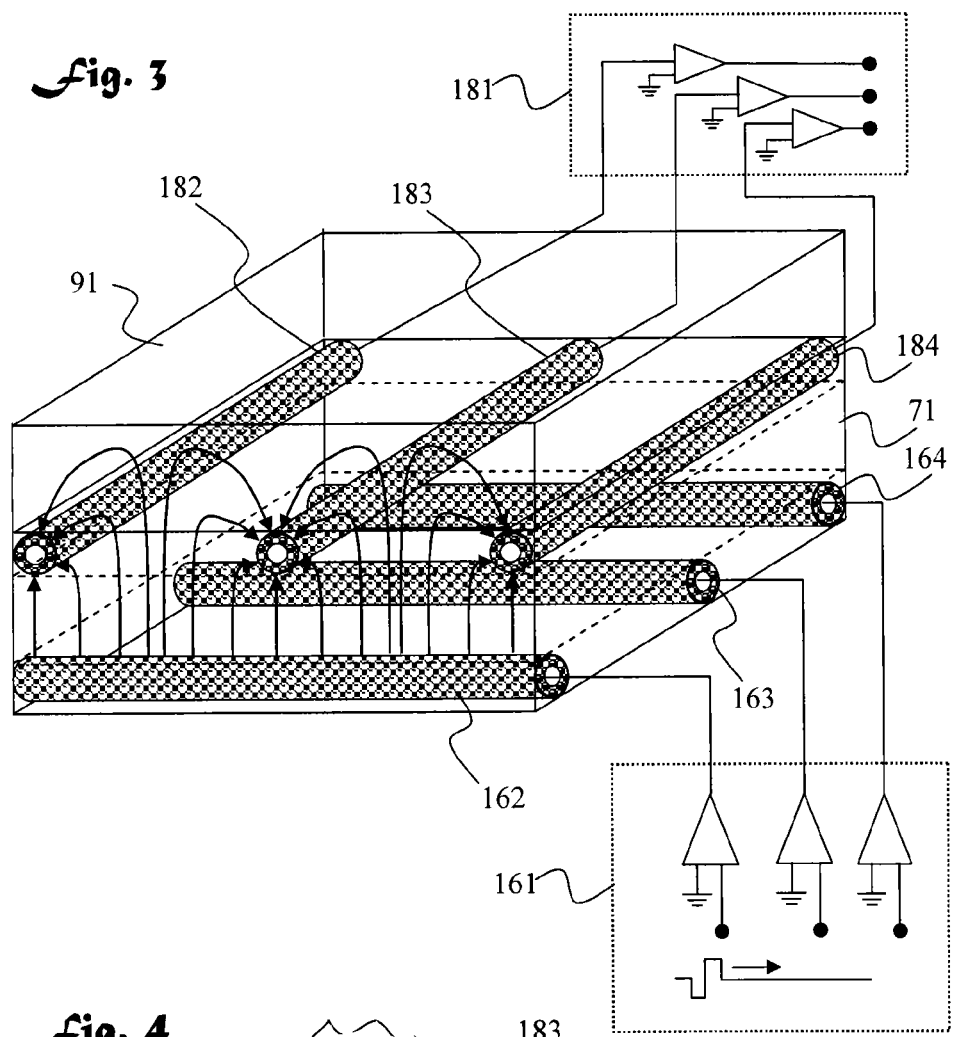
FIGS. 3 and 4 are diagrams explaining the operation of the embodiment illustrated by FIG. 2.

FIG. 3 illustrates a state of the screen 21 at the instant when the charge voltage is applied to the conductor 162 in the absence of matter linked to the ground and establishing a contact with the top face of the layer 91. Electric field lines starting from the conductor 162 are distributed evenly in the layer 71 to converge on each of the conductors 182, 183, 184 by following a basic profile that is reproducible in conditions that are identical over time.

Figure 4:
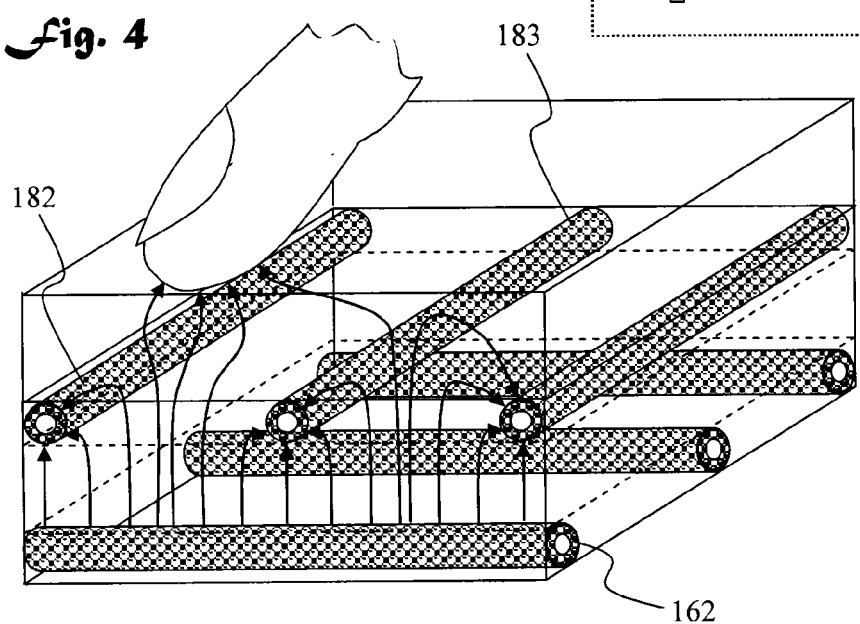

FIG. 4 illustrates the state of the screen 21, also at the instant when the charge voltage is applied to the conductor 162, but here in the presence of matter linked to the ground and establishing a contact with the top face of the layer 91. This is the case, for example, of a finger which is directly over the conductor 162 in proximity to the conductors 182 and 183. The electric field lines starting from the conductor 162 are then distributed unevenly in the layer 71 to converge partially on each of the conductors 182, 183 and partially on the finger in contact with the insulating layer 91. The electric field lines converging toward more distant conductors of the layer 81 are not disturbed by the contact of the finger and continue to follow the basic profile. The disturbance caused by the resulting charge deficit on one or more conductors 182, 183 modifies the measurement relative to these conductors in the electronic circuit 181.

A first location software module in the computer 11 is structured to analyze the measurements received from the electronic circuit 181 so as to locate the point of contact of the finger on the screen 21. A series of measurements on the conductors of the layer 81 conforming to the basic profile combined with a charge voltage applied to a sampled conductor of the layer 61 confirms an absence of matter linked to the ground in contact with the places on the screen 21 which are directly over the sampled conductor. A series of measurements on the conductors of the layer 81 which is disturbed relative to the basic profile for one or more conductors, 182, 183 in the example illustrated by FIG. 4, combined with a charge voltage applied to a sampled conductor, 162 in the example illustrated by FIG. 4, confirms a presence of matter linked to the ground in contact with the place or places on the screen 21 which is/are directly over both the sampled conductor, 162 in the example illustrated by FIG. 4, and the conductor(s) with modified measurement, 182, 183 in the example illustrated by FIG. 4.

The material used for the layer 91 can be flexible or rigid in nature. It is possible to use polyethylene terephthalate (PET), which has good transparency and electrical insulation properties and the flexibility of which allows it to be adapted to both planar or curved surfaces. It is also possible to use polymethyl methacrylate (PMMA) which also has good transparency and electrical insulation qualities and the rigidity of which makes it possible to impose a planar surface. There are in particular PMMA products with heightened transparency qualities which can be likened to those of glass.

Figure 2:
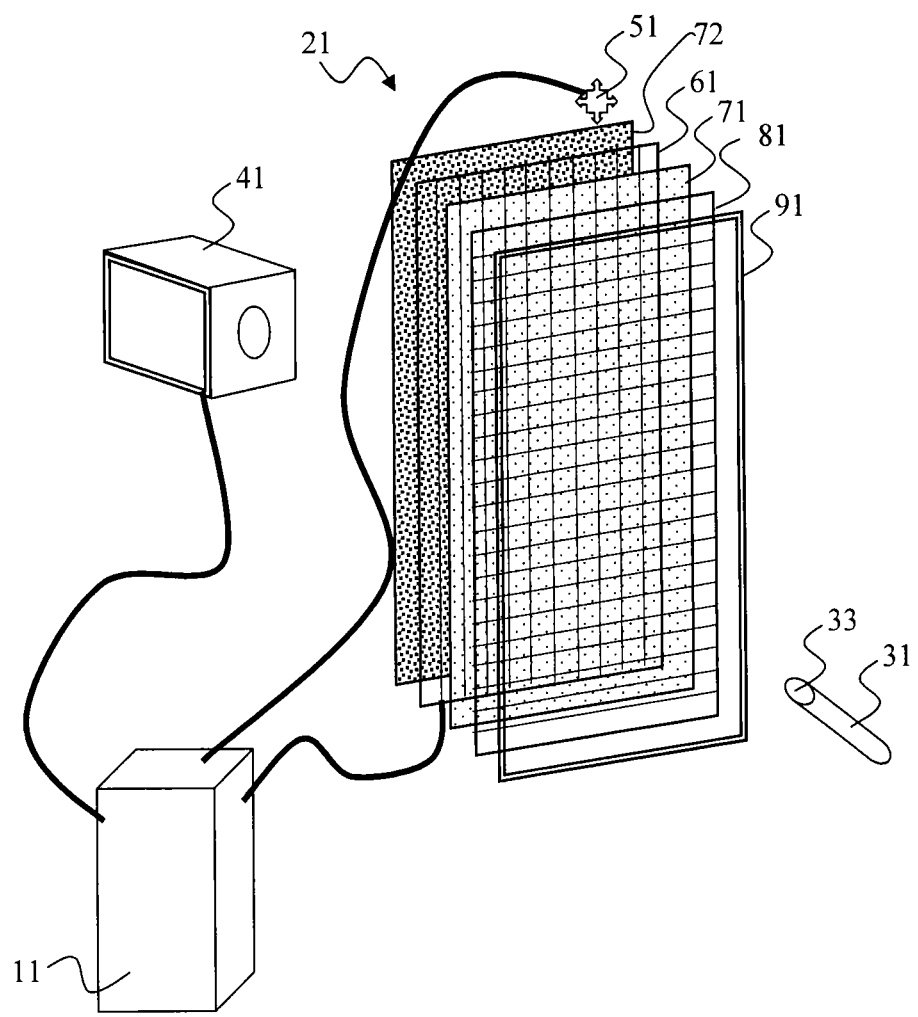
FIG. 2 is an exploded perspective view of a first embodiment of an electronic paperboard conforming to the invention.
Figure 5:
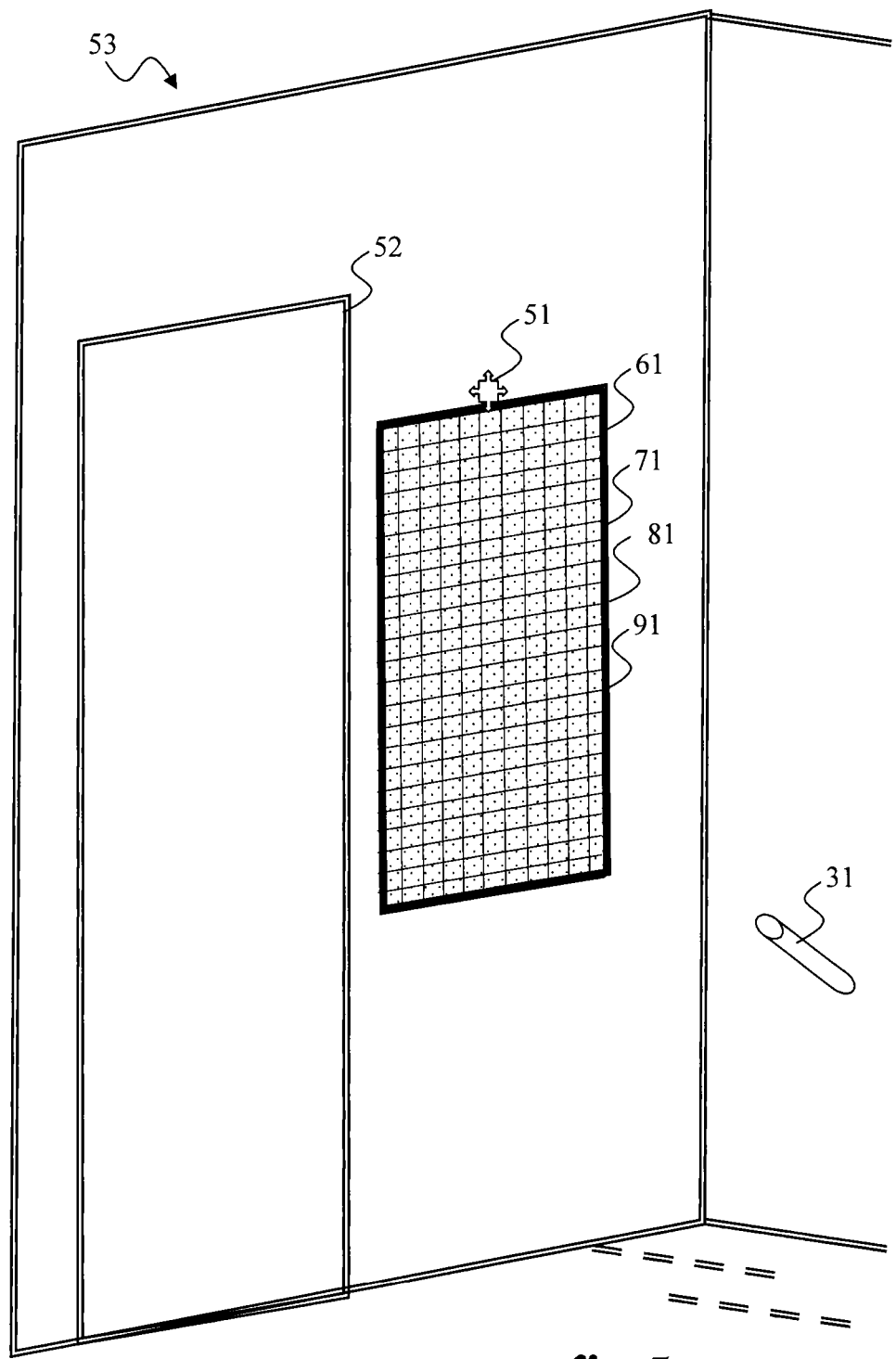
FIG. 5 shows a possible integration of the embodiment illustrated by FIG. 2.

In the embodiment of the screen 21 illustrated by FIGS. 2 and 5, the four-layer film explained above to produce the touch function of the screen 21 has a translucent skin 72 added to it so as to create a real image, that is visible from a front face of the screen 21, from an image projected by a projector 41. The projector 41, for example of video projector type, preferably comprises a wide-angle lens with short focal length so as to be able to be placed at a short distance behind the screen and thus limit the footprint needed for its implementation. The projector 41 is connected to the computer 11 which hosts a display software module structured to generate images in a form that can be projected by the projector 41.

The embodiment more particularly represented in FIG. 4 has the advantage of freeing the intellect of the user by masking the computer component of the system from that user.

The touch film and the translucent skin are incorporated in a flush embedded frame in a partition 53, behind which are concealed the projector 41 and the computer 11. The screen 21 thus merges with the wall of the room. A door 52 provides access behind the screen 21 for checking and maintaining the system. When the layer 91 on the front of the screen is produced with a flexible polymer material such as PET, a plate of rigid transparent material for example comprising PMMA, is added behind the screen, and the translucent skin and the touch film are applied to it so as to stiffen the flatness of the screen 21.

Figure 6:
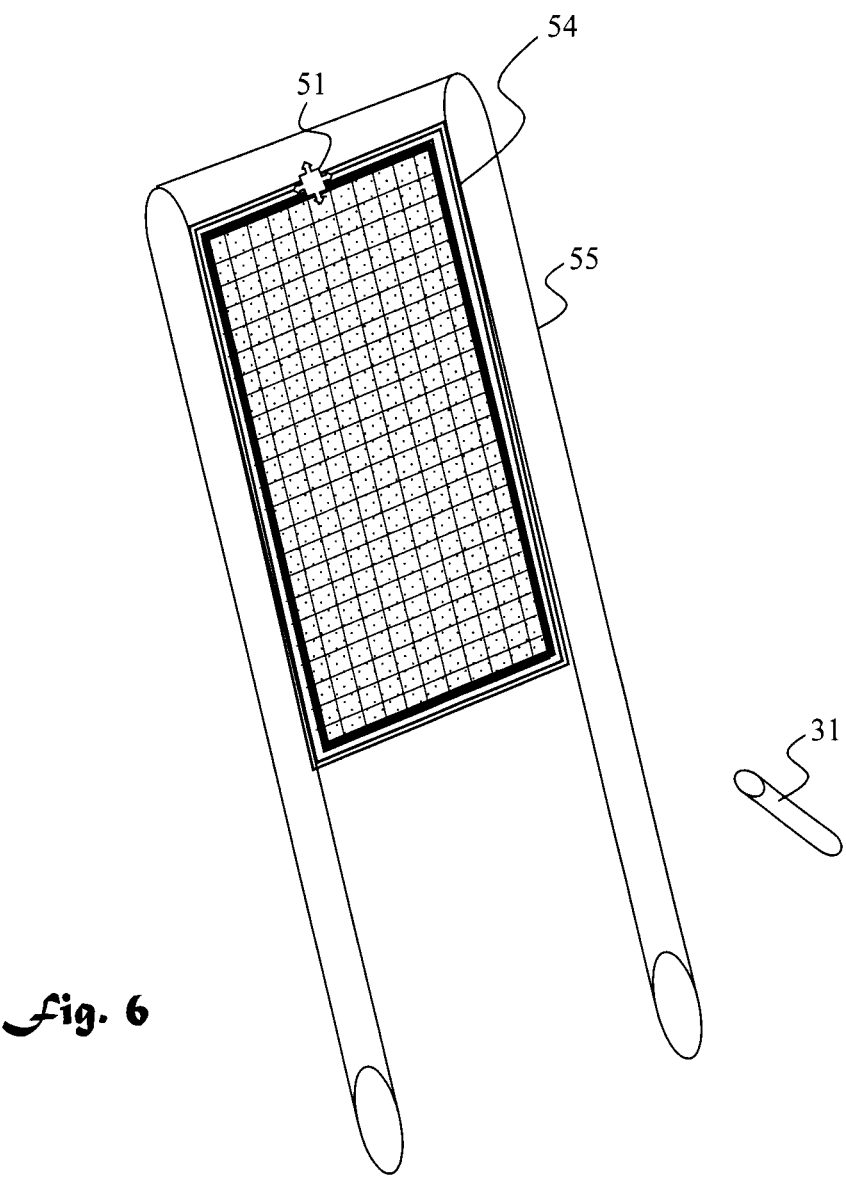
FIG. 6 is a perspective view of a second embodiment of an electronic paperboard conforming to the invention.

In the embodiment of the screen 21 illustrated by FIG. 6, the touch film is applied to a flat screen 54, for example a liquid crystal display (LCD) screen, a screen with orientable micro-mirrors (DLP, standing for Digital Light Processing), a plasma display screen or similar. If there is a flat screen 54 available that is originally of touch type that offers a sufficiently large working surface, it is also possible to directly use such a flat screen without having to use the touch film explained above.

The flat screen 54, equipped with native touch functions or touch functions that are added by the film explained above, is mounted on a trestle 55 so as to reproduce a removable paperboard which can be moved around in the room. The mounting combining the duly equipped flat screen 54 with the trestle 55 incorporates a dedicated communication processor (not represented in the figure) for exchanging, in real time, with the computer 11, the data required on the one hand to restore sensory media in visual, sound or other form and on the other hand to locate at least one finger on the flat screen 54, in other words on the screen 21. The dedicated communication processor incorporated in the mounting of FIG. 6 preferably uses a wireless communication protocol such as those of the standards of the 802.11 family or of the 802.15 family.

The second device is arranged to detect at least one object position distinct from that of a human finger on the screen 21.

The second device comprises a sensor 51 for measuring a second physical quantity different from a capacitance or an electrical charge. The second physical quantity is linked to a signal reception which varies according to the position of the object 31 relative to the screen 21. The signal is transmitted by the object 31 in a uniform manner, in other words independently of the position of the object on the screen. This simplifies the production of the object 31 because it does not have to be equipped with a sensor, for example to recognize a position that it would point to on the screen. The signal is, for example, as purely illustrative and nonexhaustive examples, of the type comprising ultrasounds, light rays invisible in the ultraviolets or preferably in the infrareds of lower energy level. For ultrasounds, the sensor 51 is, for example, an ultrasound radar. The signal can be of any other type, the only constraints being that it should be undetectable by the human senses, have a transmitted value that is independent of the coordinates of the object on the screen and comprise at least one component that does not interfere with the measurement of the first physical quantity by the first device which recognizes the position of a human finger on the screen 21.

The sensor 51, for example arranged at the center of a top edge of the screen 21, is linked to the computer 11 by a cable in the case of FIGS. 2 and 5 or by wireless link in the case of FIG. 6. A second location software module in the computer 11 is structured to analyze the measurements received from the sensor 51 so as to locate the point of contact of the object 31 on the screen 21.

In this way, the sensor 51 combined with the object 31 constitutes a device arranged to detect the position on the screen 21 of at least one object similar to the object 31 by distinguishing it naturally from a human finger without having to require the user to select a mode of interpretation or of recognition by the software modules resident on the computer 11.

In the embodiments for which there is a requirement to ensure that the sensor 51 picks up a signal from the object 31 only when the latter is in contact with the surface of the screen 21, a number of solutions are proposed.

A first solution consists in installing a directional sensor 51 which picks up the signals of the second physical quantity, for example the ultrasounds, only in a small plane thickness in proximity to the surface of the screen 21.

A second solution consists in combining, with the signal relating to the second physical quantity, a signal relating to a third physical quantity, for example infrared rays transmitted parallel to the surface from the sensor 51 combined with ultrasounds transmitted from the object.

A third solution consists in equipping one end of the object 31 with a pushbutton switch so as to activate the transmission of the uniform signal, notably a continuous train of ultrasounds at predetermined frequency, when the object 31 in mechanical contact with the screen 21 switches over the switch by pressing on the pushbutton.

The signal is then transmitted uniformly with, for example, an amplitude and a frequency that are constant and predetermined for the object 31. Another frequency, for example ultrasound, can be predetermined for another object 31 so as to distinguish different objects 31 from one another. For example, a first object 31 in the form of a pencil of a given color is parameterized to transmit the signal at a given frequency which generates a writing function on the screen in the color of the pencil. A second object 31 in the form of a pencil of another given color is parameterized to transmit the signal at another given frequency which generates a writing function on the screen in the color of the other pencil. Again for example, a third object 31 in the form of an eraser is parameterized to transmit the signal at yet another given frequency which generates an erase function on the screen. In this way, the user can write or erase a pattern on the screen with the object 31 of his or her choice in the same way as would be done with a pencil or a conventional eraser on a paperboard or on a conventional white board, thus favoring an interactivity of physical type between a number of players.

The system of FIG. 1 also comprises a panoramic wall or table which comprises a display screen 20.

The display screen 20 comprises two devices arranged to reproduce the functionalities that a panoramic wall or table can offer to one or more users.

A conventional panoramic wall generally allows the user to display one or more pages torn from the paperboard alongside possibly written notes on smaller sheets or miscellaneous documents. The user or users appreciate being able to then write on the pages displayed to illustrate their talk or analyze their ideas in more detail.

In order to reproduce the advantageous functionalities explained above, the display screen 20 has dimensions comparable to those of a conventional panoramic table, for example of the order of 3 m in diagonal or more. The display screen 20 advantageously comprises the two devices now explained with reference to FIG. 7.

The first device is arranged, here again, to detect at least one position of a human finger by measuring a first physical quantity which varies according to a human finger contact on the screen 20.

So as to embody a panoramic table by means of the screen 20, the first device is preferably of the infrared detection type. For example, the first device comprises a total internal reflection disturbance touch sensor of FTIR (Frustrated Total Internal Reflexion) type, particularly suited to surfaces of large size, generally greater than two meters in diagonal.

The screen 20 comprises a plate typically consisting of at least three transparent layers. The layer 60 is produced in a transparent material with a high optical index, for example polymethyl methacrylate (PMMA) with a refractive index equal to 1.49. The layer 80 is produced in a transparent material with low optical index, for example containing an amorphous fluoropolymer inducing a refractive index close to 1.00. The layer 90, produced in a translucent material, for example in the form of preferably satin white vinyl film, is arranged on the front face of the screen 20 so as to diffuse an incident light flux to create, on its surface, real images from projected light.

The touch operation of the screen 20 is now explained with reference to FIGS. 8 and 9.

A plurality of light-emitting diodes 75 distributed around the perimeter of the layer 60 are oriented against the edge of the layer 60 to emit a plurality of infrared (IR) light rays 76 into the thickness of the layer 60. It would be possible to use diodes emitting light on other wavelengths to obtain the technical effect explained hereinbelow. Infrared light does, however, present an interest relative to visible light which is that of being invisible to the human being and thus of not disturbing his or her visual observation of the screen. Infrared light also presents an interest compared to other invisible light frequencies, notably in the spectrum of the ultraviolets, which is that of being of low energy level and thus of not endangering the user during his or her visual observation of the screen.

The refractive index of the layer 60, greater than that of the layer 80 on the front face of the screen 20 and that of the air on the rear face, gives the layer 60 waveguide qualities that are exploited as explained hereinbelow.

FIG. 8 illustrates a state of the screen 20 in the absence of matter exerting a pressure on the top face of the layer 80. A light ray 76 emitted in the layer 60 from one of the light-emitting diodes 75 which reaches the top face or the bottom face of the layer 60 with an angle of incidence greater than the respective angle of refraction given by the Snell-Descartes law, which is the case of all the light rays at a sufficiently great distance from the light-emitting diodes 75, is reflected toward the interior of the layer 60.

Figure 9:
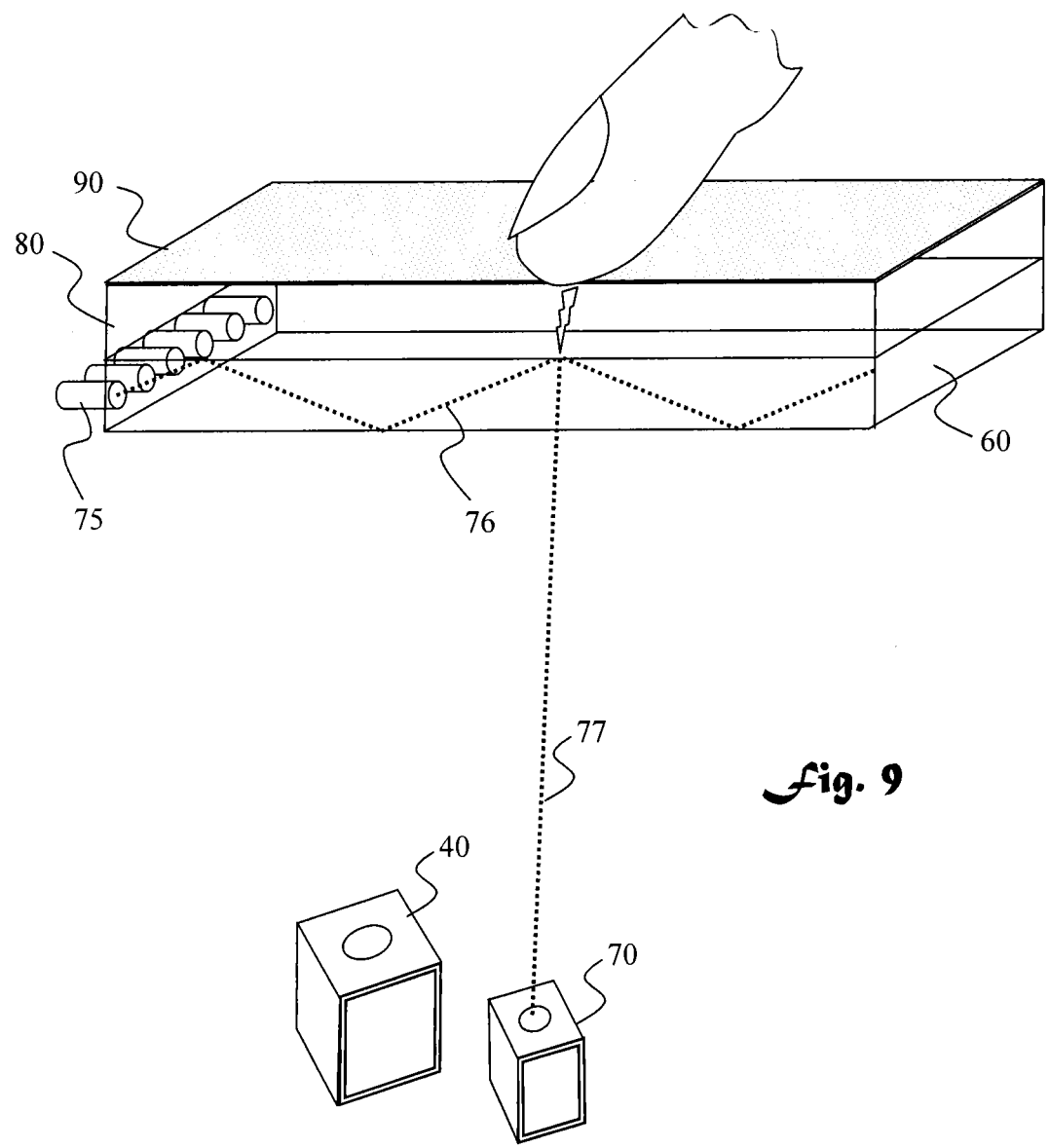

FIG. 9 illustrates a state of the screen 20 in the presence of matter exerting a pressure on the top face of the layer 80. This is the case, for example, of a finger in contact with the layer 90. The pressure exerted by the finger has the effect of modifying the refractive index of the layer 80 and of at least partially deflecting the light ray 76 toward the bottom face of the layer 60 corresponding to the rear face of the screen 20. The light ray 77 derived from the deflected portion of the light ray 76 at the point of contact, is picked up by an infrared camera 70. The infrared camera 70 is equipped with a lens with short focal length of wide-angle type so as to be able to capture an image of all of the rear face of the screen 20 by being placed at a short distance behind the screen 20. For a screen 20 of large dimensions, it is also possible to provide a number of infrared cameras 70, each capturing an infrared image of a distinct portion of the rear face of the screen 20. Each camera 70 emits its captured infrared images to a computer 10 in real time.

A first location software module in the computer 10 is structured to analyze the infrared images received from the infrared camera or cameras 70 so as to locate the point or points of contact of one or more fingers, even of another object on the screen 20. In practice, the plurality of diodes 75 arranged in a strip against the edge over the entire perimeter of the layer 60 generates a plurality of light rays 76 in the plane of the layer 60, not only of opposing directions in the directions perpendicular to the edges of the layer 60 but in all directions resulting from the width of the light beam emitted by each diode 75 and from multiple reflections of each beam at the boundaries of the layer 60. Thus, even in the case of contact on an nth point of the screen 20 behind a first point of contact on the course of a ray 76, the nth point of contact deflects all or part of at least one other light ray originating from another direction. Thus, a plurality of contacts on the screen 20 provokes a plurality of points of impact on the infrared image picked up by the or one of the infrared cameras 70. The coordinates of each point of impact are calculated by a conventional image processing program. In the case of a plurality of infrared cameras 70, the end-to-end reattachment of the images is performed once again by a conventional image processing program such as can be found, for example, in the field of photography.

The material used for the layer 90 situated at a distance from the layer 60 is preferably treated to be opaque to the wavelength of the light rays 76 so as to absorb any rays on this wavelength originating from the room and thus avoid having such rays disturb the image captured by the camera 70.

The translucent skin of the film 90 makes it possible to create a real image that is visible from a front face of the screen 20, from an image projected by a projector 40. The projector 40, for example of video projector type, preferably comprises a wide angle lens with short focal length so as to be able to be placed at a short distance behind the screen and thus limit the footprint needed for its implementation. The projector 40 is connected to the computer 10 which hosts a display software module structured to generate images in a form that can be projected by the projector 40. It is also possible to implement display software which makes it possible to manage a number of projectors 40 so as to display an image of panoramic size as is used, for example, in giant screen cinematography.

The second device is arranged to detect at least one object position distinct from that of a human finger on the screen 20.

The second device comprises a sensor 50 for measuring a second physical quantity different from a light ray circulating in a waveguide. The second physical quantity is linked to a signal reception which varies according to the position of the object 30 relative to the screen 20. The signal is emitted by the object 30 uniformly, in a way similar to the object 31. The signal emitted by the object 30 is of the same nature as that emitted by the object 31 when there is a desire to allow the user to employ the object 30 or the object 31 without restriction on the screen 20 or the screen 21. The signal emitted by the object 30 is of a kind different from that of the signal emitted by the object 31 when there is a desire to require the user to employ the object 30 and the object 31 specifically on the screen 20 and the screen 21.

The sensor 50, for example arranged at the center of a top edge of the screen 20, is linked to the computer 10 by a cable or by a wireless link. A second location software module in the computer 10 is structured to analyze the measurements received from the sensor 50 so as to locate the point of contact of the object 30 on the screen 20.

In this way, the sensor 50 combined with the object 30 here again constitutes a device arranged to detect the position on the screen 20 of at least one object similar to the object 30 by naturally distinguishing it from a human finger without having to require the user to select a mode of interpretation or of recognition by the software modules resident on the computer 10.

For large dimensions of the screen 20, a number of sensors 50 can be installed, each dedicated to a portion of the screen 20.

The system of FIG. 1 also comprises one or more personal tablets which each comprise a touch screen 14, 15, 16 assigned to a participant in the room for which the system is installed. The touch screen 14, 15, 16 of each tablet is of relatively small size, comparable to that of a portable computer so that a touch device of conventional capacitive or resistive type linked to the personal tablet is perfectly suitable. Provision can be made to be able to write on the personal tablets by means of a market-standard stylus which does not implement the second device of the invention.

The personal tablets are connected to a central computer 13 by radio link using, for example, a wireless communication protocol such as those from the standards of the 802.11 family or of the 802.15 family.

A screen 22 is associated with a horizontal work table, with touch detection device of the type with infrared capacitive or resistive detection of a finger or of an object 32. The object 32 emits or does not emit a signal as do the objects 30 and 31. In this latter case, the object 32 executes the same functions as a finger, for example in the manner of a wand which extends the action of the arm over a larger surface area. The screen 22 is connected to a computer 12.

Figure 10:
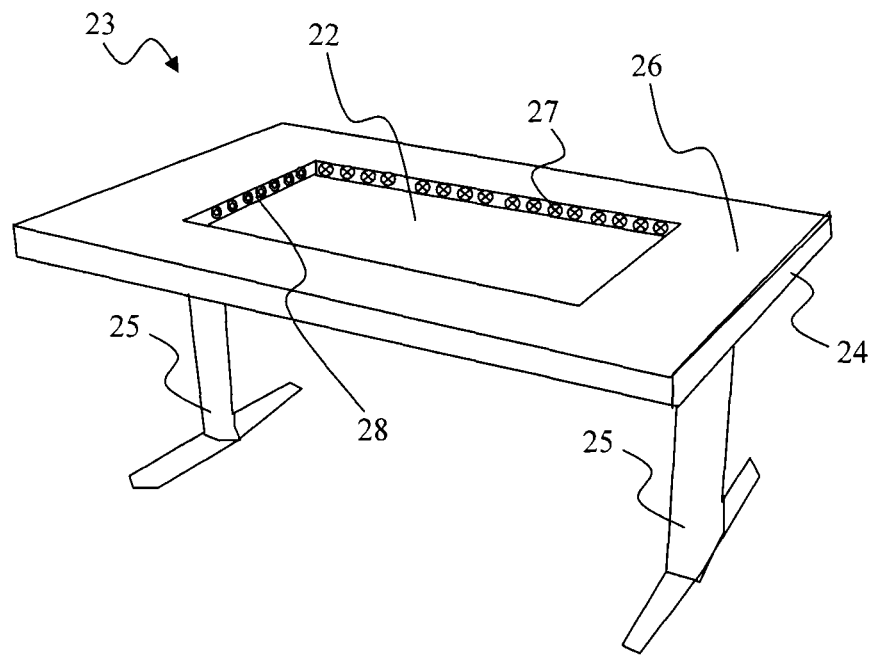
FIG. 10 is an exploded perspective view of a first embodiment of an electronic horizontal table conforming to the invention.

The horizontal table 23 represented in FIG. 10 comprises a plate 24 supported by a number of feet 25, for example two in FIG. 10, which makes the horizontal table 23 appear visually as light furniture.

The screen 22 is embedded in the thickness of the plate 24, substantially at the center of the top face so as to form wide edges 26 on which participants can deposit various objects, notably including documents or, for example, their touch tablet 14, 15, 16, 17.

Figure 7:
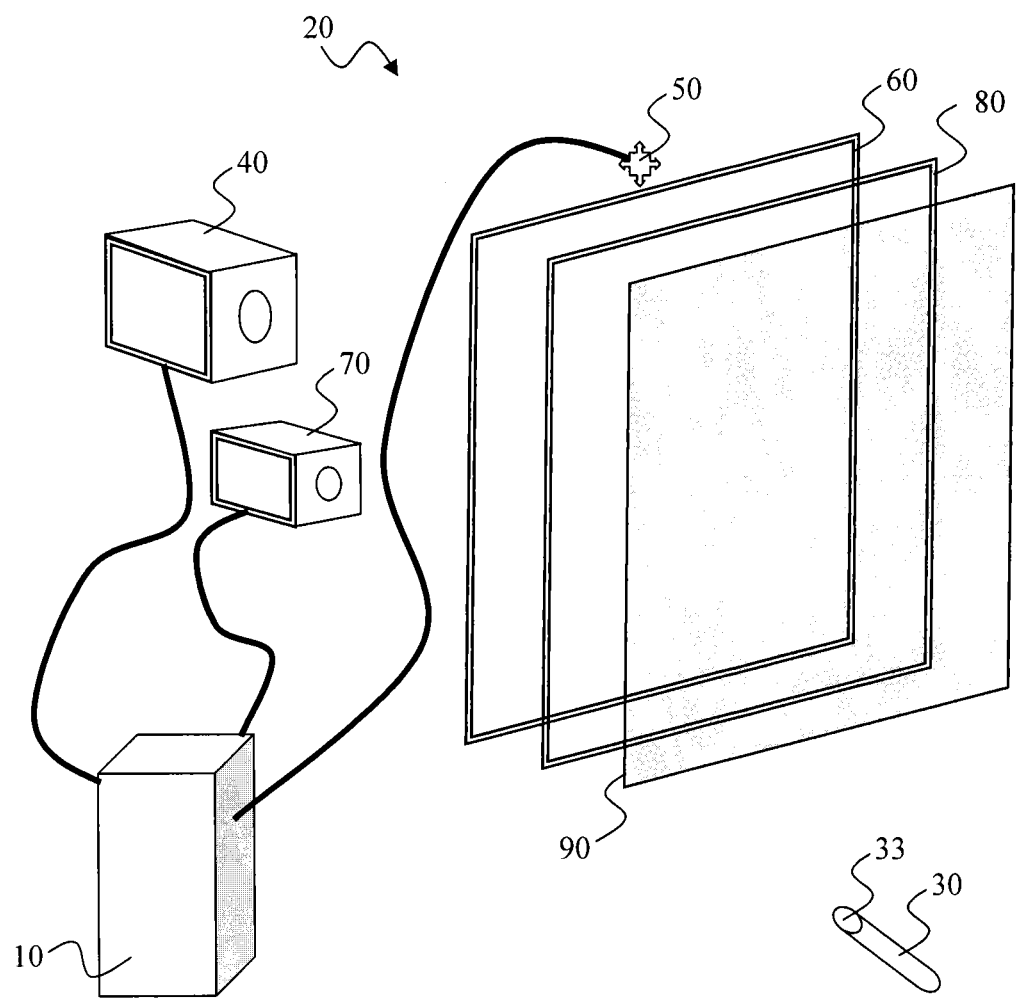
FIG. 7 is an exploded perspective view of a first embodiment of an electronic panoramic table conforming to the invention.

The screen 22 could be of the back-projection type like the screens 20 and 21 of FIGS. 2 and 7. The screen 22 of FIG. 10 is preferably a flat screen of a meter or more in diagonal, comprising the light-emitting diode, liquid crystal and plasma screens such as are commonly encountered in the audiovisual field. The use of a flat screen of this type allows for a relatively small thickness of the plate 24.

The touch function of the screen 22 is produced, for example, by using a technology of infrared detection type of LLPOT (LED Light Plane Optical Touch) type. A row of diodes 27 is arranged on two adjacent edges of the screen so as to emit a grid of infrared rays which overhang flush with the top face of the screen 22. A row of infrared receivers 28 is arranged on two opposite adjacent edges of the screen so as to detect each ray of the grid of infrared rays. A presence of living matter such as that of a finger or of inert matter such as that of a wand, in contact with the top face of the screen 22, causes an interruption of one or more infrared rays originating from one edge of the screen and of one or more infrared rays originating from the adjacent edge. The interruption of infrared rays detected by the sensors 28 of the opposite edges, enables the computer 12 to determine the coordinates of the point of contact which is located at the intersection of the interrupted infrared rays originating from two adjacent edges.

The feet 25 are designed to be able to vertically displace the plate 24 from a low position which is suitable for seated participants to a high position which is suitable for standing participants. The displacement can be obtained in various known ways, by hydraulic or pneumatic cylinders associated with solenoid valves controlled by the computer 12, by electric cylinders or an electric motor, here again controlled by the computer 12.

The computers 10, 11, 12, 13 are interconnected over a local area network 19 and comprise one and the same operating system which makes it possible to run one and the same program installed on each of the computers 10, 11, 12, 13.

The program is structured to automatically detect the screen or screens associated with the computer on which it is installed and how the computer 10, 11, 12 is configured to receive human finger positions detected by the first device and object positions 30, 31, 32 detected by the second device.

The program comprises a number of sub-programs which communicate with one another.

A control sub-program is structured to:
allocate at least one screen area 14, 15, 16, 17, 20, 21, 22 to a control function;
execute the control function when the first device detects a human finger position or the second device detects an object position 30, 31, 32 in the area of the screen 14, 15, 16, 17, 20, 21, 22 allocated to the control function.

A writing sub-program is structured to:
allocate a screen area 14, 15, 16, 17, 20, 21 for the writing;
modify, in the area allocated for the writing, a local visual appearance which follows an object position 30, 31 on the screen when the object emits its uniform signal;
vary the area allocated for writing according to a displacement linked to the position of the human finger on the screen 14, 15, 16, 17, 20, 21.

On the screens 14, 15, 16, 17, the area allocated for writing embodies a small virtual sheet of removable self-adhesive paper.

A control function is provided to generate, on demand, at least one copy of a small virtual sheet of removable self-adhesive paper on one of the personal tablet screens.

Another control function is provided to drag the generated copy, on demand, to one of the other paperboard screens, another personal tablet, panoramic table and/or horizontal work table.

A writing function is provided to modify said copy, on demand, from that of the screens on which it was generated.

Another control function is also provided to access a first content hosted by the knowledge base 18 according to request actions exerted by a human finger or by the object on the screen so as to display the first content on the screen.

Yet another control function is provided to add to the knowledge base 18 with a second content displayed on said screen according to expression actions exerted by said human finger or by said object on said screen which display said second content on said screen.

A control function is provided to insert a multimedia element into the small virtual sheet of removable self-adhesive paper.

Figure 11:
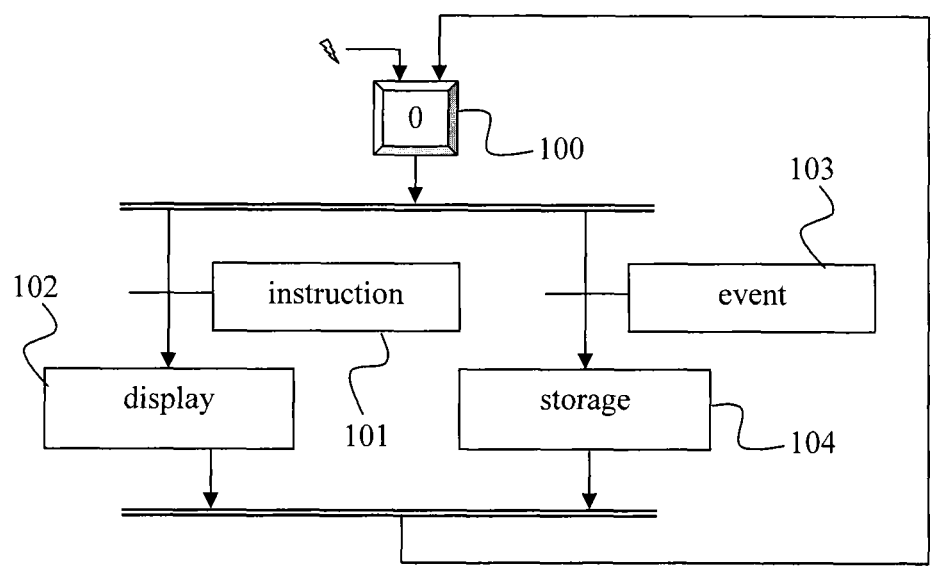
FIG. 11 shows method steps conforming to the invention.

The program notably comprises program code instructions for the execution of the steps of the method now explained with reference to FIG. 11 when the program is run on one of the computers 10 to 13.

A standby step 100 is activated by switching on the computer on which the program is installed.

An execution transition 101 is validated by the presence of a display instruction controlled by one of the participants meeting in the room containing all or some of the screens 14 to 17 and 20 to 22.

Each validation of the transition 101 activates a step 102 of display of one or more information items on a display touch screen by a first digital processing equipment item.

Now consider, for example, the first digital processing equipment item consisting of one of the tablets 14 to 17 on which the program has been installed to enable it to drive its display touch screen in the context of the method. A succession of display instructions is typically controlled by the participant in possession of the tablet 14, 15, 16, 17 constituting the first digital processing equipment item.

A start instruction generates, for example, an area of the screen of the tablet allocated for writing which embodies a small virtual sheet of removable self-adhesive paper. The small virtual sheet of removable self-adhesive paper is preferably nominally assigned to the tablet from which the area allocated for writing which embodies it has been generated, so that only the tablet which constitutes the first digital processing equipment item is authorized to enter therein or modify therein any information that it is required to contain.

A following instruction writes, for example in the area allocated for writing, an idea that the participant wants to embody in the form of handwritten information on his or her tablet by means of his or her stylus.

Alternatively or concomitantly, a following instruction inserts, for example in the area allocated for writing, an image or a printed text extract which embodies an information item retrieved from the knowledge base 18 via the computer 13.

Consider for example also the first digital processing equipment item consisting of the computer 11 on which the program has been installed to enable it to drive the display touch screen 21.

One or more display instructions can be remotely controlled by the participants in possession of a tablet 14, 15, 16, 17 then constituting, in this case, a second digital processing equipment item, for example by sending a copy of a small virtual sheet of removable self-adhesive paper to the first digital processing equipment item to display it on the display touch screen 21.

Other display instructions can be controlled locally by a participant facing the paperboard embodied by the screen 21, for example by using the touch function of the screen to drag the copy of the small virtual sheet of removable self-adhesive paper received so as to display it in another position on the display touch screen 21.

A succession of display instructions is typically controlled by one of the participants in proximity to the paperboard embodied by the screen 21 driven by the computer 11 here constituting the first digital processing equipment item.

A start instruction generates, for example, an area of all or part of the screen 21 allocated for writing which embodies a virtual sheet of paper of the paperboard. The area allocated for writing of the virtual sheet of paper is preferably generated on all of the screen apart from the areas assigned to received small virtual sheets of removable self-adhesive paper on which only one of the second digital processing equipment items is authorized to enter therein or modify therein any information that it contains.

A following instruction writes, for example in the area allocated for writing, an idea that the participant wants to embody in the form of handwritten information on the paperboard by placing one of the objects 31 available to him or her in contact with the screen 21.

Alternatively or concomitantly, a following instruction inserts here, again for example, inside or outside of the area allocated for writing, a multimedia document belonging to a set comprising images, printed text extracts or other items, embodying information that can be retrieved from the knowledge base 18 via the computer 13.

Consider, again for example, the first digital processing equipment item consisting of the computer 10 on which the program has been installed to enable it to drive the display touch screen 20.

One or more display instructions can here also be controlled remotely by the participants in possession of a tablet 14, 15, 16, 17 then constituting, in this case, one of several possible second digital processing equipment items, for example by sending a copy of a small virtual sheet of removable self-adhesive paper to the first digital processing equipment item to display it on the display touch screen 20. Similarly, one or more display instructions can be controlled remotely by one of the participants facing the paperboard embodied by the screen 21 and which can be driven by the computer 11 which then constitutes an additional second digital processing equipment item, for example by sending a copy of a virtual sheet of paper to the first digital processing equipment item to display it on the display touch screen 10.

Other display instructions can be controlled locally by a participant facing the panoramic table embodied by the screen 20, for example by using the touch function of the screen to drag the copy of the small virtual sheet of removable self-adhesive paper originating from a tablet or the copy of the virtual sheet of paper originating from the paperboard, so as to display it in another position on the display touch screen 20, for example in order to move to a second virtual sheet of paper, a copy of the small virtual sheet of removable self-adhesive paper received attached to a first virtual sheet of paper.

A succession of display instructions is typically controlled by one of the participants in proximity to the panoramic table embodied by the screen 20 driven by the computer 10 here constituting the first digital processing equipment item.

A following instruction writes, for example in the area allocated for writing, an idea or an idea association that the participant wants to add in the form of handwritten information on the panoramic table by placing one of the objects 30 available to him or her in contact with the screen 20.

Alternatively or concomitantly, a following instruction inserts here, again for example, inside or outside of the area allocated for writing, a multimedia document belonging to the set comprising images, printed text extracts or other items, embodying information that can be retrieved from the knowledge base 18 via the computer 13.

The program may also comprise other instructions, for example converting handwritten characters into print characters, associated with character recognition software, so as to be able to display the information in a more intelligible form regardless of which of the tablets 14, 15, 16, 17 or which of the computers 10, 11 constitutes the first digital processing equipment item.

One of the multimedia documents that can be displayed on one or other of the screens 20 or 21 may originate from the horizontal table 23 which simplifies the selection thereof as will now be seen.

Now consider the first digital processing equipment item consisting of the computer 12 on which the program has been installed to enable it to drive the display touch screen 22.

Display instructions can be controlled locally by one or more participants distributed around the screen 22 embedded in the horizontal table 23, for example by using the touch function of the screen to drag copies of multimedia documents originating from the knowledge base 18.

Alternatively or concomitantly, a following instruction sends, in message form, the information contained in a selected multimedia document for example to the panoramic table by means of a dedicated touch function.

A detection transition 103 is validated in the computer out of the computers 10, 11, 12 that is considered as the first digital processing equipment item, by the presence of a contextual event related to the display touch screen 20, 21, 22 driven by the first digital processing equipment item.

Each validation of the transition 103 automatically activates a step 104 of storage of the information displayed on the screen by associating it with the contextual event.

Now consider again, for example, the first digital processing equipment item consisting of the computer 11 on which the program has been installed to enable it to drive the display touch screen 21.

The event is, for example, linked to a reception by the computer 11 of a message originating from a tablet 14, 15, 16, 17 then constituting, in this case, a second digital processing equipment item. The received message typically comprises the information contained in a copy of a small sheet of removable self-adhesive paper in order to display it on the display touch screen 21.

The information contained in the small sheet of removable self-adhesive paper is then automatically stored by the computer 11 in the knowledge base 18 which is shared via the network 19 by the other computers 10, 12, 13 and by the tablets 14, 15, 16, 17 which, as seen from the program installed on the computer 11, constitute other digital processing equipment items. The information is preferably, but not necessarily, stored with descriptive data of the event, for example a sending tablet reference or receiving paperboard sheet reference notably comprising other information items displayed when the participant in possession of the sending tablet has demonstrated the need to glue his or her small virtual sheet of removable self-adhesive paper on the paperboard embodied by the screen 21. The descriptive data may notably comprise a time-of-appearance indicator of the event such as the date and time of reception of the message so as to be able to better correlate a number of information records with one another.

Other events may be detected by the computer 11, notably those linked to the actions of a participant facing the paperboard embodied by the screen 21, for example by using the touch function of the screen to drag the copy of the small virtual sheet of removable self-adhesive paper received so as to display it in another position on the display touch screen 21. A withdrawal of his or her finger from the screen by the participant constitutes an event representative of a certain degree of satisfaction, however fleeting, concerning the new position of the copy of the small virtual sheet of removable self-adhesive paper or representative of a pause required by a change in his or her thinking. It is then advantageous to store the information at that moment with the descriptive data of the event so that it will subsequently be possible to measure its context. The same applies when the withdrawal of contact does not relate to the living matter of a finger but to the inert matter of the object 31, thus marking an end of writing or of erasure of text or drawing.

Now consider once again, for example, the first digital processing equipment item consisting of the computer 10 on which the program has been installed to enable it to drive the display touch screen 20.

The event is then, for example, linked to a reception by the computer 10 of a message originating from the computer 11 which in this case constitutes a second digital processing equipment item. The received message typically comprises the information contained in a copy of a paperboard sheet in order to display it on the display touch screen 20.

The information contained in the paperboard sheet is then stored automatically by the computer 10 in the knowledge base 18. The information is preferably, but not necessarily, stored with descriptive data of the event, for example a sending paperboard sheet reference and/or a panoramic table configuration notably comprising other displayed information. The descriptive data can here again comprise a time-of-appearance indicator of the event such as the date and time of reception of the message so as to be able to better correlate a number of information records with one another.

Other events can be detected by the computer 10, notably those linked to the actions of one or more participants facing the panoramic table embodied by the screen 20, for example by using the touch function of the screen to drag the copy of the paperboard sheet received so as to display it in another position on the display touch screen 20 or to conceal it. A withdrawal of his or her finger from the screen by one of the participants constitutes an event representative of a certain degree of satisfaction, however fleeting, concerning the new position of the copy of the paperboard sheet or representative of a pause required by a change of individual or joint thinking. It is then advantageous to store the information at that moment with the descriptive data of the event so that it will subsequently be possible to measure its context. The same applies when the withdrawal of contact does not relate to the living matter of a finger but to the inert matter of the object 30, thus marking an end of writing or of erasure of text or drawing.

Concerning the table 23 for which the program has been installed on the computer 12 so as to enable it to drive the display touch screen 22, we will now consider the first digital processing equipment item consisting of the computer 12.

The event is then, for example, linked to a reception by the computer 12 of a message originating from the computer 13 which constitutes, in this case, a second digital processing equipment item. The received message typically comprises the information contained in a multimedia document extracted from the knowledge base 18 in order to display it on the display touch screen 22.

The information already contained in the knowledge base 18 is, in this case, preferably but not necessarily, associated with a storage of descriptive data of the event, for example a link to other multimedia documents containing information already displayed on the screen 22 of the table 23. The descriptive data may also comprise, as previously, a time-of-appearance indicator of the event.

Other events can be detected by the computer 12, notably those linked to the actions of one or more participants distributed around the table 23 to interact with the screen 22, for example by using the touch function of the screen to drag, one on top of the other or side by side, other different copies of multimedia documents on the display touch screen 20 or to send one of them to the panoramic table after having selected it. A withdrawal of the finger from the screen by one of the participants constitutes an event representative of a certain degree of satisfaction, however fleeting, concerning the new position of the multimedia document or representative of a pause required by a change of individual or joint thinking. It is then advantageous to store the information at that moment with the descriptive data of the event so that it will then be possible to measure its context. The same applies when the withdrawal of contact does not relate to the living matter of a finger but to the inert matter of the object 32, thus marking an end of the manipulation of multimedia documents.

The descriptive data associated with the event may also comprise a measurement of the height of the plate 24 controlled by a specific module of known type (not represented) connected to the computer 12 to raise and lower the plate 24.

An event linked to the stabilization of the plate 24 after moving it is advantageous to provoke a storage of the information displayed at that time on the screen 22 because a movement in relation to the display touch screen 22 reflects a state of mind of the participants meeting around the table to interact preferably in a standing, seated or half-seated position.

The communication system and method explained above reproduce an interactivity of physical type between at least two participants to a meeting, by making it possible to automatically store or record different relevant steps of their interactions in a natural manner, in other words without disturbing them in the pooling of their thoughts. The information then stored in the knowledge base is available to be used, added to or analyzed in subsequent meetings.

The invention claimed is:

1. A communication system for reproducing and decoupling an interactivity of physical type between at least two players such as two participants to a meeting, comprising:
   at least one display screen having first circuitry configured to
   detect at least one human finger position by measuring a first physical quantity which varies as a function of a human finger contact on said display screen, and
   detect at least one position of an object configured to emit a uniform signal by measuring a second physical quantity linked with a reception of said uniform signal which varies as a function of the position of the object with respect to the display screen; and
   second circuitry configured to
   receive the human finger's position and the object's position detected by the first circuitry,
   allocate an area of the display screen to writing,
   modify, in said area allocated to writing, a local visual aspect which follows the position of the object on the display screen when said object emits said uniform signal, and
   vary the area allocated to writing based on a displacement linked with the position of the at least one human finger on the display screen.

2. The system as claimed in claim 1, wherein said area allocated to writing demarcates a virtual removable self-adhesive sheet of paper.

3. The system as claimed in claim 1, wherein said second circuitry is further configured to:
   allocate at least one area of the display screen to a command function in conjunction with an information display, and
   execute said command function when said first circuitry detects a human finger position or a position of said object in the at least one allocated area of the display screen allocated to said command function.

4. The system as claimed in claim 1, wherein said object is configured to emit said uniform signal when the object is in mechanical contact with said display screen.

5. The system as claimed in claim 1, wherein said signal is a continuous stream of ultrasounds at predetermined frequency.

6. The system as claimed in claim 1, further comprising:
   at least one white board which includes said display screen;
   a panoramic wall which includes said display screen and/or a horizontal work table which includes the at least one white board,
   wherein said first circuitry is one of capacitive type linked with said white board screen, infrared detection type linked with said panoramic wall screen, or infrared, capacitive or resistive detection type linked with said horizontal table screen.

7. The system as claimed in claim 1, further comprising:
   at least one personal tablet which includes said display screen
   wherein said first circuitry is of capacitive type and linked with said personal tablet.

8. The system as claimed in claim 2, wherein said second circuitry is further configured to:
   generate on demand at least one copy of the small virtual removable self-adhesive sheet of paper,
   slide on demand said at least one copy towards another display screen;
   modify on demand said at least one copy based on the display screen formatting and formatting of the another display screen.

9. The system as claimed in claim 2, wherein said second circuitry is further configured to insert a multimedia element into said virtual removable self-adhesive sheet of paper.

10. The system as claimed in claim 1, wherein said second circuitry is connected to a knowledge base and is further configured to:
    access a first content hosted by said knowledge base as a function of actions of requests received from said human finger or by said object on said display screen,
    display said first content on said display screen, and
    update said knowledge base with a second content displayed on said display screen as a function of expression actions received from said human finger or by said object on said display screen.

11. A communication method for reproducing and decoupling an interactivity of physical type between at least two players, such as two participants to a meeting, comprising:
    detecting, at a display screen via first circuitry, at least one human finger position by measuring a first physical quantity which varies as a function of a human finger contact on the display screen;
    detecting, at the display screen via the first circuitry, at least one position of an object configured to emit a uniform signal by measuring a second physical quantity linked with a reception of said uniform signal which varies as a function of the position of the object with respect to the display screen;
    allocating, via second circuitry, an area of the display screen to writing;
    receiving the at least one detected position of said object;
    modifying, via the second circuitry and in said area allocated to writing, a local visual aspect which follows the position of the object on the display screen when said object emits said uniform signal;

receiving the detected position of the at least one human finger; and varying, via the second circuitry, said area allocated to writing based on a displacement linked with the position of the at least one human finger on the display screen.

12. The method as claimed in claim 11, wherein said area allocated to writing demarcates a virtual removable self-adhesive sheet of paper.

13. The method as claimed in claim 11, further comprising:

displaying at least one information item on the display screen by executing an instruction received from one of the players; and storing said information item by associating it with a contextual event related to said display screen, and to be activated automatically by detecting said event.

14. The method as claimed in claim 13, wherein said event is linked to a withdrawal of contact of living or inert matter with said display screen.

15. The method as claimed in claim 13, wherein said event is linked to receiving a message originating from a digital processing equipment item and having said information item to be displayed.

16. The method as claimed in claim 13, wherein said event is linked to a displacement in relation to said display screen.

17. The method as claimed claim 13, wherein said information item is stored in a knowledge base shared by a number of digital processing equipment items with descriptive data of said event.

18. The method as claimed in claim 13, wherein said descriptive data of said event includes a time-of-appearance indicator of said event.

19. The method as claimed in claim 17, wherein said information item is retrieved from said knowledge base.

20. The method as claimed in claim 13, wherein said information item is located in an area allocated for writing which embodies a small virtual sheet of removable self-adhesive paper or which embodies a large sheet of paper which can be detached from a stack of virtual sheets of paper.

21. The method as claimed in claim 13, wherein at least one of a number of areas allocated for writing is generated from the second circuitry which is the only circuitry authorized to modify any information contained in said generated area allocated for writing.

22. A non-transitory computer-readable medium storing computer-readable instructions thereon which when executed by a computer cause the computer to perform the method as claim in claim 11.

* * * * *